United States Patent [19]  [11] 4,271,051
Eschwey  [45] Jun. 2, 1981

[54] MODIFIED ALKYD RESINS AND THEIR USE AS LACQUER BINDERS

[75] Inventor: Helmut Eschwey, Düsseldorf-Benrath, Fed. Rep. of Germany

[73] Assignee: Henkel Kommanditgesellschaft auf Aktien, Düsseldorf-Holthausen, Fed. Rep. of Germany

[21] Appl. No.: 79,964

[22] Filed: Sep. 28, 1979

[30] Foreign Application Priority Data

Oct. 2, 1978 [DE] Fed. Rep. of Germany ....... 2842919
Jun. 1, 1979 [DE] Fed. Rep. of Germany ....... 2922370

[51] Int. Cl.³ .................. C08L 67/00; C08L 67/08; C09D 3/64
[52] U.S. Cl. .............................. 260/22 M; 260/22 A
[58] Field of Search ............... 560/89, 90; 260/22 M, 260/22 R, 22 A

[56] References Cited

U.S. PATENT DOCUMENTS

| | | | |
|---|---|---|---|
| 3,331,802 | 7/1967 | Huber et al. | 560/90 |
| 3,442,868 | 5/1969 | Ogata et al. | 560/89 |
| 4,014,854 | 3/1977 | Stevens | 560/90 |
| 4,018,815 | 4/1977 | Vogt et al. | 560/89 |
| 4,071,514 | 1/1978 | Ribbecke et al. | 260/22 M |
| 4,077,991 | 3/1978 | Stevens et al. | 560/89 |
| 4,123,404 | 10/1978 | Lasher | 560/89 |
| 4,139,525 | 2/1979 | Bacskai | 560/90 |
| 4,171,293 | 10/1979 | Eschwey et al. | 260/22 A |

*Primary Examiner*—Ronald W. Griffin
*Attorney, Agent, or Firm*—Hammond & Littell, Weissenberger & Muserlian

[57] ABSTRACT

This invention is directed to modified alkyd resins containing free hydroxyl groups, said alkyd resins being prepared by reacting glycide and/or glycerol with alkyd resins having acid numbers of from about 30 to 180 until the acid number is from about 5 to 35. The invention is also directed to the use of the modified alkyd resins as lacquer binders.

10 Claims, No Drawings

MODIFIED ALKYD RESINS AND THEIR USE AS LACQUER BINDERS

FIELD OF THE INVENTION

This invention relates to the preparation of modified alkyd resins. More particularly, this invention relates to the preparation of alkyd resins modified with glycide and/or glycerol and the use of such modified alkyd resins as water-soluble binders for lacquers, varnishes, or coating materials.

BACKGROUND OF THE INVENTION

It is known that due to their predominantly hydrophobic molecular structure, fatty acid-modified alkyd resins are insoluble in water and can be used as coating materials only when dissolved in organic solvents. For the development of environmentally acceptable lacquer systems, many attempts have been made in past years to modify lacquer binders to become emulsifiable in water, dilutable with water, or soluble in water. To achieve this, the hydrophobic alkyd resin must then be made sufficiently hydrophilic that it can be applied from an aqueous medium while, at the same time, the hydrophobic nature of the alkyd resin residue furnishes a lacquer coating that is as water-resistant as possible.

A known method for hydrophilation is the introduction of numerous carboxyl groups into alkyd resins, which polycarboxyl alkyd resins can then become water-soluble as amine salts. However, such anionically hydrophilized lacquer systems do not constitute a satisfactory solution to the problem of providing suitable binders because they contain relatively large quantities of volatile amines and, often, auxiliary organic solvents. In addition, due to the anionic nature of the binder, the lacquer film is sensitive to water and, in particular, to alkaline media.

Furthermore, it would be expected that use of aqueous emulsions or dispersions of alkyd resins would make a more favorable solution of the problem possible. Organic solvents would, for the most part, be unnecessary, and the component of volatile amines could be kept small. However, the stabilization of such emulsions is primarily achieved by condensing polyethylene glycol chains. The polyethylene glycol chains are disadvantageous because, on the one hand, the resulting lacquer coatings lack stability to water since the hydrophilic chains remain unchanged in the lacquer film, and because, on the other hand, the emulsions are characterized by typical lack of stability and insufficient degree of dispersion. Thus, there has been no major practical use of such alkyd resin emulsions.

Applicants have surprisingly found that the described disadvantages can be overcome. They have found that alkyd resins particular fatty acid modified alkyd resins can be prepared that, on the one hand, are easily dispersible in water or will form a practically clear solution without requiring major amounts of amines and that, on the other hand, keep the sensitivity of the hardened lacquer films to water as low as possible.

OBJECTS OF THE INVENTION

It is an object of this invention to provide modified alkyd resins.

It is also an object of this invention to provide alkyd resins modified with glycide and/or glycerol.

It is further an object of this invention to provide water-soluble binders comprised of such modified alkyd resins.

These and other objects of the invention will become more apparent in the discussion below.

DETAILED DESCRIPTION OF THE INVENTION

According to the invention, modified alkyd resins containing free hydroxyl groups are prepared. The preparation procedure comprises allowing glycide and/or glycerol to act upon, i.e., react with, alkyd resins, particularly fatty acid modified alkyd resins, with acid numbers between 30 and 180, preferably between 40 and 180, and particularly between 50 and 120, under known reaction conditions, until the acid number is from about 5 to 35, more particularly, from about 15 to 30. The products thus obtained can be used as binders for air-drying, in particular baking, water-dilutable lacquer systems. Advantageously, the products are present in a quantity of from about 20 to 60 percent by weight, based on the weight of the total lacquer system.

In the reaction with glycerol, i.e., glycerin, and/or glycide, i.e., glycidol, 2,3-dihydroxypropyl groups are introduced predominantly, into the alkyd resins. Depending on the content of 2,3-dihydroxypropyl groups, alkyd resins are obtained which are soluble in water or, with addition of small amounts of emulsifier, are extremely easy to emulsify. Even without addition of organic auxiliary solvents, the alkyd resins can be converted into colloidal solutions or finely divided microemulsions with particle sizes between about 0.01 and 0.5 micron, which colloidal solutions and micro-emulsions are visually indistinguishable from true solutions.

The 2,3-dihydroxypropyl groups can be introduced into the alkyd resins by addition of glycerol or glycide, or of both glycerol and glycide. In some cases it has been found expedient to let glycerol and glycide act upon fatty acid-modified alkyd resins intermittently, i.e., adding quantities of glycerol or glycide alternately, until the acid number is between about 5 and 35. For economic and technical reasons, the use of glycerol is preferred over that of glycide, which is not as readily available. On the other hand, especially when suitable catalysts are used, cross-linkage reactions can be more readily avoided with the use of glycide due to the different reactivity of the functional groups in the glycide molecule.

Accordingly, after condensation to prepare an alkyd resin, in particular a fatty acid-modified one, the following additional steps are possible:

(a) further condensation with glycerol alone;

(b) further partial condensation with glycerol to an acid number between about 30 and 150, or (c) partial addition of glycide to an acid number between about 30 and 150, followed in each instance of (b) or (c) by either further condensation with glycerol or further addition of glycide to a final acid number of between 15 and 30.

It has been found that the principle of hydrophilation of alkyd resins by means of 2,3-dihydroxypropyl groups is susceptible to numerous variations. For not only can one operate with glycerol or glycide alone, but one can also replace the 2,3-dihydroxypropyl groups to a certain extent by cumulated, i.e., a multitude of, hydroxyl groups, which can be introduced by means of other polyols, such as trimethylol propane, pentaerythrite, sorbitol, triethanolamine, diglycerin monoglycide ether, and the like. In practice, unpolymerized alkyd resins of usable viscosity will always be obtained if the basic alkyd resins used for the modification with glycerol or other hydrophilic polyols, have molecular weights (stated as numerical mean of the molecular weight, $M_n$) as related to the acid numbers, that do not substantially exceed the following values:

Acid number 180→$M_n$=600

Acid number 150→$M_n$=750

Acid number 100→$M_n$=1,100

Acid number 50→$M_n$=2,250

Due to the resulting, fine dispersion, that is, the finely dispersed nature of the modified-alkyd resin products, the disadvantages known from coarsely divided emulsions and dispersions, such as general lack of stability, deficient flow, lack of film formation, and coalescence, do not occur in such water-based lacquers. Despite the hydrophilic modification of the alkyd resins with glycerol and/or glycide, the respective lacquer coatings show excellent stability properties, in particular to water and alkalies. The reason for this is that since the glycerol/glycide-modified polyesters have abundant hydroxyl groups, they are especially polymerizable and, when baked, for example, with the commonly used hexamethyl ether of hexamethylol melamine (HMMM), lose their hydrophilic nature.

While the emulsifiability of the majority of the known alkyd resins is unsatisfactory, the alkyd resins produced according to this invention are surprisingly improved with respect to their readiness to emulsify, regardless of the formulation of the binder.

Starting materials and methods for the production of alkyd resins are known. The alkyd resins are understood to be polycondensates from multivalent alcohols and multivalent carboxylic acids, which may be modified with monoalcohols and/or monocarboxylic acids. For the preparation of bakable alkyd resins, consideration should be made of, in particular, oil-free, short- and medium-oil alkyd resins, that is, polyesters of a fatty acid content of less than approximately 55% by weight.

For the production of an alkyd resin easily emulsifiable in water, 2,3-dihydroxypropyl groups in a quantity of from about 5 to 20% by weight, based on the weight of the alkyd resin, are, as a rule, sufficient. At from about 20 to 30 percent by weight of 2,3-dihydroxypropyl groups, the alkyd resin finally becomes water-soluble, so that an addition of extraneous emulsifiers for stabilization in the aqueous medium is obviated entirely. Further hydrophilation of the alkyd resin is not recommended since it generally offers no advantage and also seems to make little sense economically.

Regardless of the selection of the alkyd resin raw materials, the acid number of the modified alkyd resin should be from about 5 to 35, preferably from about 15 to 30. Similarly, as with the known nonionically hydrophilized alkyd resins, the addition of a mild ionic stabilizer may be advisable. This may result in especially finely divided emulsions or colloidal solutions, respectively. A farther-reaching anionic hydrophilation to an acid number greater than 35 is not desired, because otherwise the advantage of the lower amine requirement, as compared with use of the known water-dilutable alkyd resins of high acid number (40 to 120), is diminished.

The alkyd resins to be produced according to the invention can be produced by any of the condensation reactions known to those skilled in the art. The starting material comprises a known alkyd resin having an acid number between about 30 and 180, preferably from about 50 to 120, and then the starting material is reacted with glycide and/or glycerol, and possibly with another polyol, thereby attaining the desired nonionic hydrophilation and lowering in a precise manner the undesirably high acid number. The reaction with the polyhydroxyl compounds and/or glycide may take place successively or simultaneously. The reaction conditions, such as temperature time, and the like, and catalysts are well known. In particular, the reaction with glycide occurs in known manner under normal conditions known for the conversion of the epoxide group. Hydroxyl and carboxyl groups react at temperatures between about 90° and 160° C. with the use of satisfactory catalysts, such as sodium methylate, tertiary amines, e.g., triethylamine or dimethylcetylamine, or aminoxides.

According to a variation of the preparation procedure, conventional alkyd resins of an acid number of from about 5 to 40, known as solvent lacquers, are reacted first with glycide and/or glycerol, polyesters free of carboxyl groups being obtained. These are then reacted with polycarboxylic acids or their anhydrides in a subsequent condensation step for adjustment of the necessary acid number to from about 5 to 35.

The resulting alkyd resins of the invention are, after partial or complete neutralization of the carboxyl groups still present, with inorganic or organic bases, colloidally soluble in water without the addition of organic solvents or easily emulsifiable with the addition of small emulsifier quantities, i.e., from about 1 to 5 percent by weight, based on the weight of the alkyd resin emulsion, respectively. Advantageously addition products are used for emulsifying or for just improving storage stability. Such products include the addition products of glycide or mixtures of glycide and ethylene oxide to fatty alcohols or, respectively, ester fatty alcohols, alkyl phenols, fatty acids, fatty amines or fatty acid amides, and the addition products of polyglycerin to fatty alcohols, all said addition products having from about 12 to 26 carbon atoms in the hydrophobic molecule portion and from about 2 to 22 hydroxyl groups per total molecule.

Also possibly useful in this regard are aminoxides of the formula

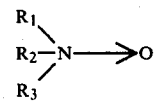

in which $R_1$ is a hydrocarbon radical of from 8 to 30, preferably from 8 to 18, carbon atoms, which may optionally contain from 1 to 3 ether groups and up to 4 hydroxyl groups and $R_2$ and $R_3$ each represent an aliphatic or cycloaliphatic hydrocarbon radical of from 2 to 32, preferably from 2 to 20, carbon atoms, optionally interrupted by a heteroatom such as oxygen, and which may also contain up to 4 hydroxyl groups. In practice, addition of an addition product of from 6 to 9 mols glycidol to 1 mol nonyl phenol has proved satisfactory.

The glycidyl emulsifiers are condensable and, when condensed, make hardened coatings. The aminoxide emulsifiers are thermolabile and degrade under heating. In either case, the emulsifiers alter so that they cannot be leached from the final coating.

Neutralization of carboxyl groups is preferably carried out with organic amines, particularly higher boiling amines such as dimethyl ethanolamine or condensable and nonvolatile dihydroxypropyl groups containing lower aliphatic amines obtainable by reaction from said amines with glycide.

The colloidal solutions or micro-emulsions can be pigmented according to conventional methods. Outstanding for their especially good properties as lacquer binders are combinations of the alkyd resins according to the invention with amino resin formers, such as hexamethyl ethers of hexamethylolamine or the corresponding condensates thereof. The baking of the lacquer films, done by application of the colloidal solutions or micro-emulsions according to the invention by known methods, occurs after predrying at temperatures between about 120° and 180° C. in suitable drying stoves or drying tunnels.

The lacquers can be used for the coating of a variety of materials, such as glass or metal, e.g., aluminum, iron, steel, and the like. The respective baked coatings excell in particular with regard to their improved stability to water. They are clearly superior both to the conventional emulsions and to the water-dilutable, amine-neutralizable systems of high acid number. They reach, or in part exceed, the quality standard of the alkyd resins as they are used or applied from solvents. In this regard, special mention should be made concerning the advantages resulting from completely dispensing with organic solvents and from the extremely small proportion of volatile amines.

The following examples are intended to illustrate the present invention and are not to be construed as limiting the invention thereto.

EXAMPLES

I. Production of alkyd resins containing 2,3-dihydroxypropyl groups

Use of glycide only

In the following examples, condensation was effected in a heatable round flask of glass, which are equipped with an agitator and water separator, in known manner under nitrogen. The components for the first step were heated, either altogether or as the components were gradually added, with the addition of 80 ml xylene, until the desired acid number was obtained.

Subsequently, the batch was cooled to 120° C., and after addition of 3 g dimethylcetylamine per 100 g of solution, the indicated quantity of glycide was added in drops. After 30 minutes the reactions with glycide were complete and the condensation products were ready for use.

Details concerning the production of the alkyd resins, Examples 1 to 4, containing 2,3-dihydroxypropyl groups according to the invention and of comparison acid alkyd resins $V_1$ to $V_4$ are given below:

EXAMPLE 1

Condensation components:
268.1 g of fractionated fatty acid (chain length distribution: 2% $C_6$, 60% $C_8$, 35% $C_{10}$, and 3% $C_{12}$)
394.3 g of trimethylol propane
63.1 g of adipic acid The reaction time was two hours, the reaction temperature was 235° to 240° C., and the final acid number was <5.

By addition of 274.5 g of trimellitic acid anhydride and further heating, condensation was continued to an acid number of 120. After cooling to 120° C., the product was reacted under stirring with 168 g of glycide to an acid number of 23.4.

EXAMPLE 2

The following components were condensed or esterified in two stages:
266.5 g of fatty acids (8% stearic acid, 32% oleic acid, and 54% conjugated and 6% non-conjugated linolic acid)
87.6 g of glycerol
228.5 g of butan-1,3-diol
234.8 g of phthalic acid anhydride
182.7 g of trimellitic acid anhydride The reaction time was six hours, the reaction temperature was 200° C., and the final acid number was 81. Subsequently, 75 g of glycide was added for reaction to an acid number of 26.4.

EXAMPLE 3

Condensation components:
401.3 g of fatty acid (chain length distribution: 1% $C_6$, 98% $C_8$, and 1% $C_{10}$)
283.6 g of pentaerythrite
192.7 g of phthalic acid anhydride
125.3 g of adipic acid The reaction time was two hours, the reaction temperature was 240° C., and the final acid number was 70.6. This was followed by reaction with 62 g of glycide to an acid number of 26.2.

EXAMPLE 4

Condensation components:
257 g of fatty acids (15% palmitic acid, 5% stearic acid, 25% oleic acid, 45% linolic acid, and 7% linolenic acid
84.6 g of glycerol
254.7 g of neopentyl glycol
226.8 g of phthalic acid anhydride
176.5 g of trimellitic acid anhydride The reaction time was five and one-half hours, the reaction temperature was 200° C., and the acid number of the reaction product was 81.8. Subsequently, the reaction product was further reacted with 84 g of glycide to an acid number of 18.

For comparison purposes, the condensates suitable as bases for water-dilutable alkyd resins were produced using the condensation procedures of Examples 1 to 4 but without reaction with glycide. In the first example, condensation with trimellitic acid was continued to an acid number of 85, and the condensation product was designated as $V_1$. Comparison resins prepared according to Examples 2 to 4 were designated $V_2$, $V_3$, and $V_4$, respectively, and the acid numbers were 81, 70.6, and 81.8, respectively.

Production by combined condensation and addition of glycerol and glycide

The reactions were carried out in the same round flask as described above. Details for the production of the alkyd resins according to the invention, Examples 5 to 8, and of the comparison acid alkyd resins $V_5$ to $V_7$ are given below:

EXAMPLE 5

Condensation components:
141.7 g of fractionated fatty acid (chain length distribution: 2% $C_6$, 60% $C_8$, 35% $C_{10}$, and 3% $C_{12}$)
84.6 g of glycerol
254.7 g of neopentyl glycol
226.8 g of phthalic acid anhydride
176.4 g of trimellitic acid anhydride The reaction time was 1.5 hours, and the reaction temperature reached a maximum of 190° C. The acid number of the resin was 114.

In a second reaction step, 822.0 g of the alkyd resin produced above were reacted with 127 g of glycerol. The reaction time was forty-five minutes, the reaction temperature was 180° C. to 190° C., and the acid number of the product was 22.4.

EXAMPLE 6

The following components were condensed and esterified, respectively, in two steps:
257.4 g of fatty acids (15% palmitic acid, 5% stearic acid, 25% oleic acid, 45% linolic acid, and 7% linolenic acid)
84.6 g of glycerol
254.7 g of neopentyl glycol
226.8 g of phthalic acid anhydride
176.4 g of trimellitic acid anhydride The reaction time was one and one-half hours, the reaction temperature reached a maximum of 190° C., and the acid number of the condensate product was 105.5.

Subsequently, 131.3 g of glycerol were reacted with 936.0 of the condensate product of the first step to the acid number 24.5. The reaction took place at a temperature of 180° to 190° C. over forty-five minutes.

EXAMPLE 7

Condensation components:
257.4 g of fatty acids (8% stearic acid, 32% oleic acid, and 54% conjugated and 6% non-conjugated linolic acid)
84.6 g of glycerol
254.7 g of neopentyl glycol
226.8 g of phthalic acid anhydride
176.4 g of trimellitic acid anhydride The reaction time was one and one-half hours, the reaction temperature reached a maximum of 190° C., and the acid number of the condensate product was 95.5.

Subsequently, 994.4 g of the condensate product of the above step were reacted with 73.2 g of glycerol to the acid number 57.8.

Lastly, the second condensate of acid number 57.8 was reacted with glycide in a third reaction step:
993.0 g of alkyd resin (acid number 57.8)
30.0 g of glycerylamine (adduct from 1 mol 2-amino-2-methyl propanol and 2 mol glycide) as catalyst
48.3 g of glycide The reaction time was ten minutes, the reaction temperature was 120° C., and the acid number of the product was 22.5.

EXAMPLE 8

Condensation components:
934.0 g of the first condensate product, of acid number 95.5, from Example 7
28.0 g of dimethylaminoethanol as catalyst of the glycide addition
45.6 g of glycide The reaction time was 10 minutes, the reaction temperature was 120° C., and the acid number of the alkyd resin product was 55.3.

Then, in a further condensation step, 1,008.0 g of the alkyd resin product from above was reacted with 58.4 g of glycerol over 30 minutes at a reaction temperature of from 180° to 190° C. The acid number of the product was 26.0.

For the purposes of comparison condensates suitable as bases for water-dilutable alkyd resins were prepared following the procedures of Examples 5 to 7 but without reaction with glycerol and glycidol. In preparing a resin condensate corresponding to Example 5, condensation was continued to an acid number of 86. The resulting resin product was designated $V_5$. The comparison products corresponding to Examples 6 and 7 were designated $V_6$ and $V_7$, respectively, and had acid numbers of 82 and 79, respectively.

II. Production and testing of coatings

From Examples 1 to 4

The alkyd resins according to the invention prepared in Examples 1 to 4 were mixed hot with 4.4 g of the adduct of 7.5 mols glycide to 1 mol nonyl phenol as auxiliary emulsifier (per 100 g of resin), and the mixture was neutralized with dimethyl ethanolamine. Subsequently, enough water was added for the mixture to contain 45% by weight of solids content. All compositions were practically clear and looked like solutions, i.e., they corresponded in their outward appearance to conventional lacquer solutions or water-diluted alkyd resin lacquers, respectively.

The compositions of the coating agents prepared from the modified resins of Examples 1 to 4, into each of which 19.2 g of the hexamethyl ether of the hexamethylol melamine (HMMM) had been mixed, are set forth in the following table:

TABLE 1

| Example: | Coating Composition (Percent by Weight) | | | |
|---|---|---|---|---|
| | 1 | 2 | 3 | 4 |
| Alkyd resin | 42.0 | 42.0 | 42.0 | 42.0 |
| Dimethyl-ethanolamine | 1.5 | 1.8 | 1.7 | 1.2 |
| Emulsifier | 3.0 | 3.0 | 3.0 | 3.0 |
| Water | 53.5 | 53.2 | 53.3 | 53.8 |

For comparison, coating agents were produced also from the corresponding resins $V_1$ to $V_4$. To prepare the coating agents, the resins were diluted with ethylene glycol monobutyl ether to a solids content of 85% by weight, neutralized with a quantity of dimethyl ethanolamine corresponding to the acid number, and diluted with water to 45% by weight solids content. The compositions of the coating agents appear below in Table 2. For baking, coatings were also mixed with hexa(methoxymethyl)melamine as crosslinking agent in the weight ratio of alkyd resin:malamine resin equal to 7:3, i.e., 19.2 g of melamine resin per 100 g of coating.

In the following Table 2 the composition of coatings prepared from comparison resins $V_1$ to $V_4$ is set forth:

TABLE 2

| Comparison: | Coating Composition (Percent by Weight) | | | |
|---|---|---|---|---|
| | $V_1$ | $V_2$ | $V_3$ | $V_4$ |
| Resin | 45.0 | 45.0 | 45.0 | 45.0 |
| Ethylene glycol monobutyl ether | 7.9 | 7.9 | 7.9 | 7.9 |
| Dimethyl ethanolamine | 6.1 | 4.5 | 5.1 | 5.9 |
| Water | 41.0 | 42.6 | 42.0 | 41.2 |

Testing of the coatings:

To test the films, the coating agents were spread on glass plates and baked at 150° C. for 30 minutes. The dry film thickness was 50 microns. The film hardness was determined by measuring the pendulum hardness according to DIN 53157.

To determine the stability to water, the films were immersed in distilled water at 40° C. and evaluated for bubble formation and peeling after 1, 5, 10, 20, and 30 hours, respectively. The evaluation was based on a 5-point system:

1—Film unchanged
2—Beginning bubble formation at the edge
3—Slight bubble formation on the entire film surface
4—Intense bubble formation on the entire film surface
5—Film detached from the glass base.

All films were clear, glossy, and without undesirable running and furnished sufficiently hard lacquer films.

The results of the testing, with regard to pendulum hardness and behavior toward distilled water, are set forth in the following table:

TABLE 3

| | Test Results | | | | | |
|---|---|---|---|---|---|---|
| | Pendulum Hardness | | Water Stability | | | |
| Resin | (DIN 53157) (Sec) | 1 Hr. | 5 Hrs. | 10 Hrs. | 20 Hrs. | 30 Hrs. |
| Example 1 | 135 | 1 | 1 | 1 | 1 | 2 |
| Example 2 | 114 | 1 | 1 | 1 | 1-2 | 2 |
| Example 3 | 117 | 1 | 1 | 1 | 1 | 2 |
| Example 4 | 128 | 1 | 1 | 1 | 1-2 | 1-2 |
| $V_1$ | 147 | 1 | 5 | 5 | 5 | 5 |
| $V_2$ | 120 | 1 | 2 | 3 | 5 | 5 |
| $V_3$ | 112 | 1 | 1 | 4 | 5 | 5 |
| $V_4$ | 125 | 1 | 2 | 3 | 4 | 5 |

Alkyd resins prepared according to Examples 1 to 4 were mixed hot with 3.0 g of the adduct of 4 mols of ethyleneoxide to 1 mol of the aminoxide of dodecylamine (see the formula above wherein $R^1$ and $R^3$ each represent $-O-CH_2CH_2-O-CH_2CH_2OH$ and $R^2$ is dodecyl) as auxiliary emulsifier (per 100 g of resin), and the mixture was neutralized with dimethyl ethanolamine. Subsequently, enough water was added for the mixture to contain 45% by weight of solids content. All compositions were practically clear and looked like solutions, i.e., they corresponded in their outward appearance to conventional lacquer solutions or water-diluted alkyd resin lacquers, respectively.

For baking, the coating lacquers from the resins of Examples 1 to 4, designated here as Examples 1.1 to 4.1, were mixed with the hexamethyl ether of the hexamethylol melamine (HMMM) as crosslinking agent in the weight ratio of alkyd resin:melamine resin equal to 7:3. The coatings of Examples 1.1 to 4.1 were tested according to the procedure explained above. All films were clear, glossy and without undesirable running and gave sufficiently hard lacquer films. The results of the testing, with regard to pendulum hardness and behavior toward distilled water, are set forth in the following table:

TABLE 4

| | Test Results | | | | |
|---|---|---|---|---|---|
| | Pendulum Hardness | | Water Stability | | |
| Resin | (DIN 53157) (Sec) | 1 Hr. | 5 Hrs. | 10 Hrs. | 20 Hrs. | 30 Hrs. |
| Example 1.1 | 130 | 1 | 1 | 1 | 1-2 | 2 |
| Example 2.1 | 120 | 1 | 1 | 1 | 2 | 2-3 |
| Example 3.1 | 115 | 1 | 1 | 1 | 1 | 2 |
| Example 4.4 | 126 | 1 | 1 | 1 | 2 | 2-3 |

From Examples 5 to 8

The alkyd resins according to the invention prepared in Examples 5 to 8, were mixed hot with 2.2 g of the adduct of 7.5 mols glycide to 1 mol nonyl phenol as auxiliary emulsifier and 4.4 g of the adduct from 2 mols glycide to 1 mol 2-amino-2-methyl propanol (per 100 g of resin). Subsequently, enough water was added for the mixture to contain 45% by weight of fatty substance. All compositions were practically clear and looked like solutions, i.e., they corresponded in their outward appearance to conventional lacquer solutions or water-diluted alkyd resin lacquers, respectively. For comparison, coating agents were also made from the corresponding comparison resins $V_5$ to $V_7$. Then, the resins were diluted with ethylene glycol monobutyl ether to a solids content of 85 percent by weight, neutralized with a quantity of dimethyl ethanolamine corresponding to the acid number, and diluted with water to 45% by weight solids content.

While the comparison coating lacquers still contained a proportion of organic solubilizers and volatile amines, the coating lacquers according to the invention were free from volatile organic components, that is, they were purely aqueous.

For baking, the coating lacquers from the resins of Examples 5 to 8 and comparison resins $V_5$ to $V_7$ were mixed with the hexamethyl ether of the hexamethylol melamine (HMMM) as crosslinking agent in the weight ratio of alkyd resin:melamine resin equal to 7:3.

The coatings were tested according to the procedure explained above. All films were clear, glossy and without undesirable running and gave sufficiently hard lacquer films. The results of the testing, with regard to pendulum hardness and behavior toward distilled water, are set forth in the following table:

TABLE 5

| | Test Results | | | | | |
|---|---|---|---|---|---|---|---|
| | Pendulum Hardness | | Water Stability | | | | |
| Resin | (DIN 53157) (Sec) | 1 Hr. | 5 Hrs. | 10 Hrs. | 20 Hrs. | 30 Hrs. | 50 Hrs. |
| Example 5 | 185 | 1 | 1 | 1 | 1 | 1 | 1 |
| Example 6 | 128 | 1 | 1 | 1 | 1 | 1 | 1 |
| Example 7 | 132 | 1 | 1 | 1 | 1 | 1 | 2 |
| Example 8 | 103 | 1 | 1 | 1 | 1 | 1 | 1 |
| $V_5$ | 155 | 1 | 2 | 3 | 5 | 5 | 5 |
| $V_6$ | 125 | 1 | 2 | 3 | 4 | 5 | 5 |
| $V_7$ | 102 | 1 | 2 | 3 | 5 | 5 | 5 |

EXAMPLE 9

By use of a procedure corresponding to that of Example 2, the following components were condensed or esterified in two stages to form a fatty acid-free alkyd resin:

200.0 g of trimethylol propane
250.0 g of neopentylglycol
401.0 g of phthalic acid anhydride
200.0 g of adipic acid The reaction time was five hours, the reaction temperature was 170°–190° C., and the final acid number was 85.1. Subsequently, 81.6 of glycide was added and reacted to an acid number of 22.2.

For comparison purposes, a condensate suitable as a base for a water-dilutable alkyd resin was produced using the procedure above but without reaction with glycide. This comparison resin, which had an acid number of 85.1, was designated $V_9$.

A coating agent was prepared from the alkyd resin with an acid number of 22.2 by mixing the resin hot with 4.4 g of the adduct of 7.5 mols glycide to 1 mol nonyl phenol as auxiliary emulsifier (Emulsifier 1), per 100 g of resin, and then neutralizing the mixture with dimethyl ethanolamine. Subsequently, enough water was added for the mixture to contain 45% by weight of solids content. Another coating agent was prepared according to an analogous procedure using as auxiliary emulsifier 3.0 g of the adduct of 4 mols of ethyleneoxide to 1 mol of the aminoxide of dodecylamine (Emulsifier 2). Both coating compositions were practically clear and looked like solutions, i.e., they corresponded in their outward appearance to conventional lacquer solutions or water-diluted alkyd resin lacquers, respectively.

A coating agent composition was also prepared from comparison resin $V_9$ by diluting with ethylene glycol monobutyl ether to a solids content of 85% by weight, neutralizing with a quantity of dimethyl ethanolamine corresponding to the acid number, and diluting with water to 45% by weight solids content.

For baking, each of the three coating compositions were also mixed with hexa(methoxymethyl)melamine as crosslinking agent in the weight ratio of alkyd resin:-melamine resin equal to about 7:3, i.e., 19.2 g of melamine resin per 100 g of coating.

The coatings were tested according to the procedure described above. All films were clear, glossy and without undesirable running and gave sufficiently hard lacquer films. The results of the testing, with regard to pendulum hardness and behavior toward distilled water, are set forth in the following table:

TABLE 6

| Resin | Pendulum Hardness (DIN 53157) (Sec) | Water Stability | | | |
|---|---|---|---|---|---|
| | | 1 Hr. | 5 Hrs. | 10 Hrs. | 20 Hrs. | 30 Hrs. |
| Example 9-A* | 177 | 1 | 1 | 1 | 1 | 2 |
| Example 9-B** | 173 | 1 | 1 | 1 | 2 | 2 |

TABLE 6-continued

| Resin | Pendulum Hardness (DIN 53157) (Sec) | Water Stability | | | |
|---|---|---|---|---|---|
| | | 1 Hr. | 5 Hrs. | 10 Hrs. | 20 Hrs. | 30 Hrs. |
| $V_9$ | 170 | 1 | 1 | 2 | 4 | 5 |

*With Emulsifier 1
**With Emulsifier 2

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A process for the production of alkyd resin modified to contain free hydroxyl groups which comprises reacting alkyd resin having an acid number of from about 40 to 180 with glycide, glyerol, or a mixture thereof, until the acid number of the alkyd resin is from about 5 to 35 and the alkyd resin contains from about 5 to 30 percent by weight, based on the weight of the alkyd resin, of 2,3-dihydroxypropyl groups.

2. The process of claim 1 wherein the reaction proceeds until the acid number of the resin is from about 15 to 30.

3. The process of claim 1 wherein the alkyd resin is a fatty acid-modified alkyd resin.

4. An alkyd resin modified to contain free hydroxyl groups produced according to the process of claim 1.

5. A process of preparing a water-soluble lacquer system which comprises incorporating therein as lacquer binder from 20 to 60 percent by weight, based on the total weight of the lacquer system, of the alkyd resin of claim 4.

6. The process of claim 5 wherein from about 1 to 5 percent by weight of a condensable or thermolabile emulsifier glycide adduct on an aminoxide base is added to the lacquer system.

7. The process of claim 5 wherein from about 1 to 10 percent by weight of a condensable and nonvolatile neutralizing agent selected from dihydroxypropyl groups containing lower aliphatic amines obtainable by reaction from amines with glycide is added to the lacquer system.

8. A lacquer system prepared according to claim 5.

9. A process of preparing a water-soluble lacquer system which comprises incorporating therein as lacquer binder from 20 to 60 percent by weight, based on the total weight of the lacquer system, of an alkyd resin modified to contain free hydroxyl groups, said resin being prepared by reacting a fatty acid modified alkyd resin having an acid number of from about 40 to 180 with glycide, glycerol, or a mixture thereof, until the acid number of the alkyd resin is from about 5 to 35 and the alkyd resin contains from about 5 to 30 percent by weight, based on the weight of the alkyd resin, of 2,3-dihydroxypropyl groups.

10. A lacquer system prepared according to claim 9.

* * * * *